Patented Sept. 25, 1951

2,568,745

UNITED STATES PATENT OFFICE 2,568,745

DEMULSIFYING COMPOSITION AND PROCESS FOR BREAKING AN OIL-IN-WATER EMULSION

Willard H. Kirkpatrick, Sugar Land, Tex., assignor to Visco Products Company, Houston, Tex., a corporation of Delaware No Drawing. Application January 11, 1949, Serial No. 70,368

17 Claims. (Cl. 252—331)

This invention relates to new chemical compositions and to the art of resolving petroleum emulsions, more particularly petroleum emulsions of the oil-in-water type, encountered, for example, in the production, handling and refining of petroleum. These oil-in-water emulsions, or so-called reversed emulsions, occur frequently in the Flower's Bluff, Freer and Seven Sisters pools of Southwestern Texas, and are occasionally encountered in other oil producing areas.

Oil field emulsions, for the most part, are of the water-in-oil-type. The oil-in-water or reversed emulsions, to which the present invention is particularly directed, are frequently encountered, however, in the areas noted above. A reversed emulsion, as encountered in the oil fields, contains a small amount of oil, usually less than 1%, as the disperse phase, and its presence is denoted by the milky tinge which it imparts to the water, usually low in salt content. In the aforementioned areas, both types of emulsions are produced together, that is, the water which is the disperse phase in the normal water-in-oil emulsion is, in itself, an oil-in-water emulsion. Ordinary demulsifiers which resolve water-in-oil emulsions, have little or no effect on oil-in-water type emulsions. These latter emulsions have heretofore proven difficult to resolve and the recovery of the oil contained therein, which often means the difference between a successful and unsuccessful operation, has presented many problems.

One of the objects of the present invention is to provide new and useful chemical compositions.

Another object of this invention is to provide a new and improved process for separating petroleum emulsions into their component parts, i. e., oil and water.

A further object of the invention is to provide a process for the resolution of emulsions encountered outside oil fields, as, for example, water in the hold of a ship contaminated with oil; in such cases clarification of the water prior to disposal in a harbor or bay area may be effected by the method herein described. Likewise, the process of the present invention may be employed in various other cases where separation of emulsions into their component parts is desired.

Further objects will appear from the following descriptions in which the reagents and the processes for their employment relate to the treatment of petroleum emulsions.

It has been discovered that petroleum emulsions, and particularly the reversed oil-in-water emulsions, may be readily and quickly resolved into their component parts by the use of the compositions disclosed herein. Further, the investigation shows that after treatment the water discharged from the gun barrel and settling tanks has excellent clarity, and the recovered oil is homogeneous, e. g., free from flocculent materials obtained when inorganic electrolytes such as calcium chloride and/or zinc chloride with or without protective colloids are used. In some instances, it has been found to be preferable to treat a mixture containing both types of emulsions by a single fluid containing a composition of the present invention and an additional substance adapted to resolve the normal water-in-oil emulsions, where the chemicals for treating the different emulsions are compatible.

According to the invention, it has been found that new and improved results are obtained in resolving reversed emulsions by treating such emulsions with compositions comprising essentially a solution in a mutual solvent of a hydrophilic colloid and a molecularly dehydrated condensation product of the reaction of zinc chloride and the residue remaining from the reaction of an alkylene oxide having at least two carbon atoms and ammonia after the removal of the monoamines in which the molar ratio of alkylene oxide to nitrogen does not exceed 3:1.

For the purposes of this invention, the molecularly dehydrated product is preferably at least partially neutralized with an acid, and the partially neutralized product may be admixed with one or more hydrophilic unionized colloids in the presence of a suitable diluent.

The compositions of the invention are improved in their stability and effectiveness by the addition of a gel liquefying agent or gel inhibiting agent, preferably urea.

Examples of suitable hydrophilic unionized colloids are starches, dextrines, British gums, gum arabic, gelatin, glue, casein, gum tragacanth, gum karaya, agar-agar, tannin, urea-formaldehyde water dispersible resins and water soluble alkyl celluloses, e. g., methyl cellulose.

The gel liquefying ingredient apparently has no demulsifying effect per se on reversed emulsions, but permits a higher concentration of the active ingredient before the composition tends to gel when subjected to low temperatures. The higher concentration of the active ingredient also has a very pronounced effect on the results obtained in breaking petroleum emulsions. Instead of urea, other water soluble homologues or analogues thereof may be employed, e. g., methyl urea. Urea derivatives, including salts, and related compounds, such as dicyandiamide, as well as other compounds having a gel liquefying action on the hydrophilic unionized colloid, may also be used to partly or wholly replace the urea, it being understood, however, that urea is the preferred gel liquefying agent for the purpose of the invention.

By reacting the alkylene oxides, e. g., ethylene, isopropylene, and isobutylene oxides with ammonia primary, secondary and tertiary alkylolamines are the principal products formed. These reactions are exothermic and an operating temperature of 50 degrees C. to 60 degrees C. is usually satisfactory. If technical 28% aqueous ammonia is employed, primary, secondary and tertiary amines are obtained in varying proportions, dependent entirely on the alkylene oxide-ammonia ratio. In rectification of the reaction mixture the various amines are separated by distillation. The tertiary alkylolamine, being the highest boiling member, comes over last. In commercial operations there is a gradual accumulation of still bottoms or still residues consisting of materials having boiling points above 280 degrees C. at atmospheric pressure and considerably in excess of the corresponding tertiary alkylolamine. There is no authentic information as to the constitution of these residues.

The preferred alkylene oxide-ammonia residue is derived from the manufacture of commercial triethanolamine from ethylene oxide and ammonia. The material is a dark, very viscous, hygroscopic liquid which boils above 244 degrees C. at 50 mm.

The manufacture of the following primary, secondary and tertiary alkylolamines from alkylene oxides and ammonia results in the formation of still residues which would be suitable starting materials for the purpose of the invention: diethanolamine, octylethanolamine, cyclohexylethanolamine, dipropanolamine, propylpropanolamine, benzylethanolamine, propyldiethanolamine, tripropanolamine, methyldipropanolamine, cyclohexyldiethanolamine, ethyldicyclohexanolamine, trihexanolamine, 2-amino-2-methyl-1-propanol, octadecyldiethanolamine and polyethanolamine.

The modifiaction with zinc chloride of a residue from the reaction of ethylene oxide and ammonia after the removal of monoethanolamine, diethanolamine and triethanolamine results in a substantially viscous liquid which retains its characteristic solubility in water and alcohol and an increased solubility in hydrocarbons over the parent residue. The modified products are more alkaline than the original triethanolamine and possess unusual properties which are not normally associated with triethanolamine and the parent residue.

It will be understood that it is not desired to be limited by the above listing for other obvious equivalents to those skilled in the art may be employed to produce materials of the kind contemplated within the scope of this invention.

A resolving agent of the type herein described may be applied to the material to be demulsified in any of the suitable ways well known to those skilled in the art. Specifically, it may be injected in a single small stream, either continuous or intermittent, at short intervals into the flow line of the oil well by means of a force feed pump. Or it may be added manually to the fluid in a gun barrel, using agitation with gas to secure thorough mixing. As prepared by the procedures herein outlined it is occasionally somewhat too concentrated or viscous, or both, for convenient handling in commercial proportioning pumps but it may readily be diluted with any suitable diluent employed as an intermediate vehicle. It is possible to secure effective resolving action by the addition of very small amounts of a resolving agent within a range from about 0.05% to as low as 0.0004% by weight of the emulsion to which the resolving agent is added.

In order to illustrate specifically the materials employed in the new process described herein for use in accordance with the present invention, the following examples are set forth below as being typical of products suitable for use in this process. It is to be understood, however, that the invention is not confined to the specific chemicals or proportions thereof set forth in these examples as it will be obvious that equivalents of these chemicals and other proportions may be used without departing from the spirit of this invention and the scope of the appended claims. Unless otherwise indicated the quantities are stated in parts by weight.

*Example I*

In a reaction vessel 750 parts of still residue from the reaction of ethylene oxide and ammonia at 50 degrees C. to 60 degrees C. after the removal of monoamines in which the ratio of ethylene oxide to ammonia was not more than 3:1 (known as Polyamine T or Amine Residue T) and 25 parts of technical zinc chloride were heated with vigorous stirring. At a temperature of 202 degrees C. an aqueous distillate began to form and the heating was continued until 80 parts of an aqueous distillate had been secured. This operation required 5½ hours at a temperature in excess of 200 degrees C. After cooling to approximately 100 degrees C., 550 parts of water was added to yield the modified amine residue intermediate.

To 630 parts of the material prepared as above described, there was added 100 parts of muriatic acid with vigorous stirring. In a separate vessel 60 parts of glue was dissolved in 135 parts of tap water. After solution had been completed 90 parts of urea was added to the glue solution with stirring. This latter solution was then added to the partially neutralized modified amine residue intermediate and agitated well to yield a homogeneous finished product.

*Example II*

To 300 parts of the modified amine residue intermediate as prepared in Example I, 90 parts of muriatic acid was added with stirring until partial neutralization had been secured. In a separate vessel 45 parts of glue was dissolved in 100 parts of hot water. To the glue solution was added 68 parts of urea with stirring and when solution was complete the mixture was added to the partially neutralized material as prepared above to yield the finished product.

*Example III*

The partial neutralization of 300 parts of the modified amine residue intermediate as prepared in Example I was accomplished by adding 105 parts of muriatic acid with stirring. In a separate vessel 45 parts of gelatin was dissolved in 100 parts of hot water. To the gelatin solution was added 68 parts of methyl urea with stirring and when solution was complete the colloidal solution was added to the partially neutralized material as prepared above to yield the finished product.

Example IV

In a reaction vessel 750 parts of Amine Residue T (Polyamine T) was heated to 100° C. and at that point 55 parts of technical zinc chloride was added. The temperature was raised with stirring and 80 parts of an aqueous distillate was secured beginning at 204° C. and continuing heating to a final temperature of 257° C. After cooling to approximately 100° C., 550 parts of water was added to yield the modified residue intermediate.

To 630 parts of the above intermediate product there was added with vigorous stirring 100 parts of muriatic acid to effect partial neutralization. In a separate vessel 600 parts of gum arabic was dissolved in 135 parts of tap water. After solution had been completed 90 parts of dicyandiamide was added with stirring. The two solutions as prepared above were mixed and agitated well to yield a homogeneous finished product.

Example V

The partial neutralization of 300 parts of the modified amine residue intermediate as prepared in Example IV was accomplished by adding 90 parts of muriatic acid with stirring. In a separate vessel 45 parts of glue was dissolved in 100 parts of hot water. To the glue solution was added 68 parts of urea with stirring and when solution was complete this colloidal solution was added to the partially neutralized intermediate to yield the finished product.

Example VI

The partial neutralization of 300 parts of the modified amine residue intermediate as prepared in Example IV was accomplished by adding 105 parts of muriatic acid. In a separate vessel 45 parts of glue was dissolved in 100 parts of water. To the glue solution was added 68 parts of urea and when solution was complete this colloidal solution was added to the partially neutralized intermediate to yield the finished product.

Example VII

In a reaction vessel 750 parts of a still residue known as Amine Residue T (Polyamine T) was heated to 100° C. and at this point 80 parts of technical zinc chloride was added. At 187° C. an aqueous distillate began to form and a total of 89 parts was secured in about 3 hours at a maximum temperature of 231° C. After cooling the reaction mass to approximately 100° C., 550 parts of water was added to yield the modified amine residue intermediate.

To 315 parts of the above intermediate there was added 75 parts of muriatic acid to secure partial neutralization. In a separate vessel 45 parts of glue was dissolved in 100 parts of hot water. To the glue solution was added 68 parts of urea and when solution was complete this colloidal solution was added to the partially neutralized material as prepared above to yield the finished product.

Example VIII

The partial neutralization of 300 parts of the intermediate as prepared in Example VII was accomplished by adding 90 parts of muriatic acid. In a separate vessel 45 parts of glue was dissolved in 100 parts of hot water. To the glue solution was added 68 parts of urea and when solution was complete this colloidal solution was added to the partially neutralized material as prepared above to yield the finished product.

Example IX

The partial neutralization of 300 parts of the intermediate as prepared in Example VII was accomplished by adding 105 parts of muriatic acid. In a separate vessel 45 parts of glue was dissolved in 100 parts of hot water. To the glue solution was added 68 parts of urea with stirring and when solution was complete this colloidal solution was added to the partially neutralized material as prepared above to yield the finished product.

In the foregoing examples ordinary tap water served as a mutual solvent between the molecularly dehydrated zinc chloride condensation product and the hydrophilic colloid. Other suitable solvents are isopropyl alcohol, ethylene glycol and homologous water-miscible alcohol ethers.

From the evaluation of many products made in accordance with the description herein the following conclusions can be made. A maximum emulsion resolution is secured when technical zinc chloride was employed in the range of 7% to 10% by weight of the alkylolamine residue. A higher concentration than 10% results in a noncompatible composition with the resulting insoluble portion amounting in some cases to as much as 33% to 50% by weight of the reaction mass. The insoluble portion can be reduced by partial neutralization but cannot be eliminated. Comparatively poor results were secured in those compositions in which the metallic salt was used in a concentration less than 3% by weight of the still residue.

By and large partial neutralization improves the emulsion resolution efficiency. Maximum efficiency is noted at about 10% mineral acid with 5% mineral acid showing somewhat decreased efficiency. The unneutralized materials have demulsifying characteristics and will resolve oil-in-water emulsions, or so-called reversed emulsions. These general conclusions are based on observations covering tests made on many emulsions. Obviously, there would be some deviations in these conclusions if the examinations were limited to a single oil-in-water emulsion.

Various examples of the many products which answer the descriptions herein made are contemplated. Some of the products may be oil soluble, others water soluble. In many instances they may possess dual solubility to an appreciable extent. Even apparent insolubility is of no consequence, as the products are all soluble at least to the extent necessary for segregation at the emulsion interface as a water wettable colloid. The suitability of many of these products to the breaking and resolving of any given emulsion can readily be determined by the conventional procedures now in general use in oil fields and in laboratories which make such determinations.

The relative proportions of the demulsifier chemical and the hydrophilic unionized colloid may be varied rather widely, any substantial amount of the colloid (even as low as 1%) producing some enhanced effectiveness. In general, however, the preferred ratio is within the range of one part of such colloid to three to nine parts by weight of the demulsifier chemical.

The amount of urea or other gel liquefying agent used should preferably be sufficient to increase the solubility of the hydrophilic colloid in water at ordinary temperatures (e. g., 75 degrees F.). In other words, by adding the gel liquefying agent the concentration of the gelable hydrophilic colloid may be increased without gelation to a point where gelation would ordinarily occur at the temperature of the emulsion breaking composition if no gel liquefying agent were added. Even as much as 5% of the gel liquefying agent by weight of the hydrophilic colloid may have the desired gel inhibiting action on some colloids. In general, the weight ratio of the water soluble urea to the hydrophilic colloid will be within the range of 0.5 to 1 to 4 to 1.

The total quantity of solvent will depend upon the amount required to give a flowable, pumpable liquid of the proper viscosity for use in a chemical proportioning pump.

The use of the invention and the advantage thereof in breaking a particular emulsion will be governed by the nature of the oil-in-water emulsion which it is desired to break. In the Southwest Texas area where the oil is largely naphthenic or naphthenic-asphaltic, the oil-in-water emulsions formed are in general much more stable and more difficult to break than the California emulsions (e. g., Mt. Poso emulsions) where the oil is principally asphaltic. The present invention is especially advantageous in breaking the Southwest Texas emulsions.

The invention is hereby claimed as follows:

1. A process for the resolution of oil-in-water emulsions which comprises subjecting an oil-in-water emulsion to the action of a composition comprising essentially a molecularly dehydrated condensation product of the reaction of 3% to 10% by weight of zinc chloride and the residue remaining from the reaction of an alkylene oxide having at least two carbon atoms and ammonia after the removal of monoamines in which the ratio of alkylene oxide to nitrogen does not exceed 3:1, and a hydrophilic unionized colloid intimately dispersed in a mutual solvent for said colloid and said condensation product.

2. A process for the resolution of oil-in-water emulsions which comprises subjecting an oil-in-water emulsion to the action of a composition comprising essentially a molecularly dehydrated condensation product of the reaction of 3% to 10% by weight of zinc chloride and the residue remaining from the reaction of an ethylene oxide and ammonia after the removal of monoamines in which the ratio of ethylene oxide to nitrogen does not exceed 3:1, and a hydrophilic unionized colloid intimately dispersed in a mutual solvent for said colloid and said condensation product.

3. A process for the resolution of oil-in-water emulsions which comprises subjecting an oil-in-water emulsion to the action of a composition comprising essentially a molecularly dehydrated condensation product of the reaction of 3% to 10% by weight of zinc chloride and the residue remaining from the reaction of an alkylene oxide having at least two carbon atoms and ammonia after the removal of monoamines in which the ratio of alkylene oxide to nitrogen does not exceed 3:1, a water soluble urea, and a hydrophilic unionized colloid intimately dispersed in a mutual solvent for said colloid and said condensation product.

4. A process for the resolution of oil-in-water emulsions which comprises subjecting an oil-in-water emulsion to the action of a composition comprising essentially a molecularly dehydrated condensation product of the reaction of 3% to 10% by weight of zinc chloride and the residue remaining from the reaction of an ethylene oxide and ammonia after the removal of monoamines in which the ratio of ethylene oxide to nitrogen does not exceed 3:1, a water soluble urea, and a hydrophilic unionized colloid intimately dispersed in a mutual solvent for said colloid and said condensation product.

5. A process for the resolution of oil-in-water emulsions which comprises subjecting an oil-in-water emulsion to the action of a composition comprising essentially a molecularly dehydrated condensation product of the reaction of 7% to 10% by weight of zinc chloride and the residue remaining from the reaction of an alkylene oxide having at least two carbon atoms and ammonia after the removal of monoamines in which the ratio of alkylene oxide to nitrogen does not exceed 3:1, and a hydrophilic unionized colloid intimately dispersed in a mutual solvent for said colloid and said condensation product.

6. A process for the resolution of oil-in-water emulsions which comprises subjecting an oil-in-water emulsion to the action of a composition comprising essentially a molecularly dehydrated condensation product of the reaction of 7% to 10% by weight of zinc chloride and the residue remaining from the reaction of ethylene oxide and ammonia after the removal of monoamines in which the ratio of ethylene oxide to nitrogen does not exceed 3:1, and a hydrophilic unionized colloid intimately dispersed in a mutual solvent for said colloid and said condensation product.

7. A process for the resolution of oil-in-water emulsions which comprises subjecting an oil-in-water emulsion to the action of a composition comprising essentially a partially neutralized molecularly dehydrated condensation product of the reaction of 3% to 10% by weight of zinc chloride and the residue remaining from the reaction of an alkylene oxide having at least two carbon atoms and ammonia after the removal of monoamines in which the ratio of alkylene oxide to nitrogen does not exceed 3:1, and a hydrophilic unionized colloid intimately dispersed in a mutual solvent for said colloid and said condensation product.

8. A process for the resolution of oil-in-water emulsions which comprises subjecting an oil-in-water emulsion to the action of a composition comprising essentially a partially neutralized molecularly dehydrated condensation product of the reaction of 3% to 10% by weight of zinc chloride and the residue remaining from the reaction of ethylene oxide and ammonia after the removal of monoamines in which the ratio of ethylene oxide to nitrogen does not exceed 3:1, and a hydrophilic unionized colloid intimately dispersed in a mutual solvent for said colloid and said condensation product.

9. A process for the resolution of oil-in-water emulsions which comprises subjecting an oil-in-water emulsion of the type found in Southwestern Texas to the action of a composition comprising essentially an acidified molecularly dehydrated condensation product of the reaction of 3% to 10% by weight of zinc chloride and the residue remaining from the reaction of ethylene oxide and ammonia after the removal of monoamines in which the ratio of ethylene oxide to nitrogen does not exceed 3:1, urea, and an animal glue dispersed in a mutual solvent.

10. A composition comprising essentially a molecularly dehydrated condensation product of the reaction of 3% to 10% by weight of zinc chloride and the residue remaining from the reaction of an alkylene oxide having at least two carbon atoms and ammonia after the removal of the monoamines in which the molar ratio of alkylene oxide to nitrogen does not exceed 3:1, and a hydrophilic unionized colloid dispersed in a mutual solvent.

11. A composition comprising essentially a molecularly dehydrated condensation product of the reaction of 3% to 10% by weight of zinc chloride and the residue remaining from the reaction of an alkylene oxide having at least two carbon atoms and ammonia after the removal of the monoamines in which the molar ratio of alkylene oxide to nitrogen does not exceed 3:1, at least partially neutralized with an acid, intimately dispersed in a mutual solvent with a hydrophilic colloid.

12. A composition comprising essentially a molecularly dehydrated condensation product of the reaction of 7% to 10% by weight of zinc chloride and the residue remaining from the reaction of an alkylene oxide having at least two carbon atoms and ammonia after the removal of the monoamines in which the molar ratio of alkylene oxide to nitrogen does not exceed 3:1, and a hydrophilic unionized colloid dispersed in a mutual solvent.

13. A composition comprising essentially a molecularly dehydrated condensation product of the reaction of 3% to 10% by weight of zinc chloride and the residue remaining from the reaction of an ethylene oxide and ammonia af.er the removal of the monoamines in which the molar ratio of ethylene oxide to nitrogen does not exceed 3:1, and a hydrophilic unionized colloid dispersed in a mutual solvent.

14. A composition comprising essentially a molecularly dehydrated condensation product of the reaction of 7% to 10% by weight of zinc chloride and the residue remaining from the reaction of an alkylene oxide having at least two carbon atoms and ammonia after the removal of the monoamines in which the molar ratio of alkylene oxide to nitrogen does not exceed 3:1, a water soluble urea, and a hydrophilic unionized colloid dispersed in a mutual solvent.

15. A composition comprising essentially a molecularly dehydrated condensation product of the reaction of 3% to 10% by weight of zinc chloride and the residue remaining from the reaction of an ethylene oxide and ammonia after the removal of the monoamines in which the molar ratio of ethylene oxide to nitrogen does not exceed 3:1, a water soluble urea, and a hyprophilic unionized colloid dispersed in a mutual solvent.

16. A composition comprising essentially a molecularly dehydrated condensation product of the reaction of 7% to 10% by weight of zinc chloride and the residue remaining from the reaction of alkylene oxide having at least two carbon atoms and ammonia after the removal of the monoamines in which the molar ratio of alkylene oxide to nitrogen does not exceed 3:1, at least partially neutralized with an acid, intimately dispersed with animal glue, urea, and a mutual solvent.

17. A composition comprising essentially a partially neutralized molecularly dehydrated condensation product of the reaction of 7% to 10% by weight of zinc chloride and the residue remaining from the reaction of ethylene oxide and ammonia after the removal by distillation of the monoamines in which the molar ratio of ethylene oxide to nitrogen does not exceed 3:1, urea, animal glue, and a mutual solvent.

WILLARD H. KIRKPATRICK.

REFERENCES CITED

The following references are of record in the file of this patent:

UNITED STATES PATENTS

| Number | Name | Date |
|---|---|---|
| 2,159,313 | Blair | May 23, 1939 |
| 2,407,895 | Monson et al. | Sept. 17, 1946 |
| 2,422,177 | Blair | June 17, 1947 |
| 2,427,326 | Goodloe | Sept. 9, 1947 |
| 2,492,473 | Fuchs | Dec. 27, 1949 |

OTHER REFERENCES

Felice Garelli & Angelo Telamanzi: "The Reaction of Triethylolamine & Metallic Salts," Gazzetta Chemica Italiana, vol. 64, page 478 (1934).